A. J. COOK.
Harvester Rake.

No. 10,691.

2 Sheets—Sheet 1.

Patented March 28, 1854.

A. J. COOK.
Harvester Rake.

2 Sheets—Sheet 2.

No. 10,691.

Patented March 28, 1854.

UNITED STATES PATENT OFFICE.

A. I. COOK, OF ENON, OHIO.

IMPROVEMENT IN THE DISCHARGING APPARATUS OF HARVESTERS.

Specification forming part of Letters Patent No. 10,691, dated March 28, 1854.

*To all whom it may concern:*

Be it known that I, A. I. COOK, of Enon, Clarke county, and State of Ohio, have made certain new and useful Improvements in Reaping and Mowing Machines; and I do hereby declare that the following is a full and exact description of the same, reference being had to the accompanying drawings, making a part of this specification, in which—

Figure 1:
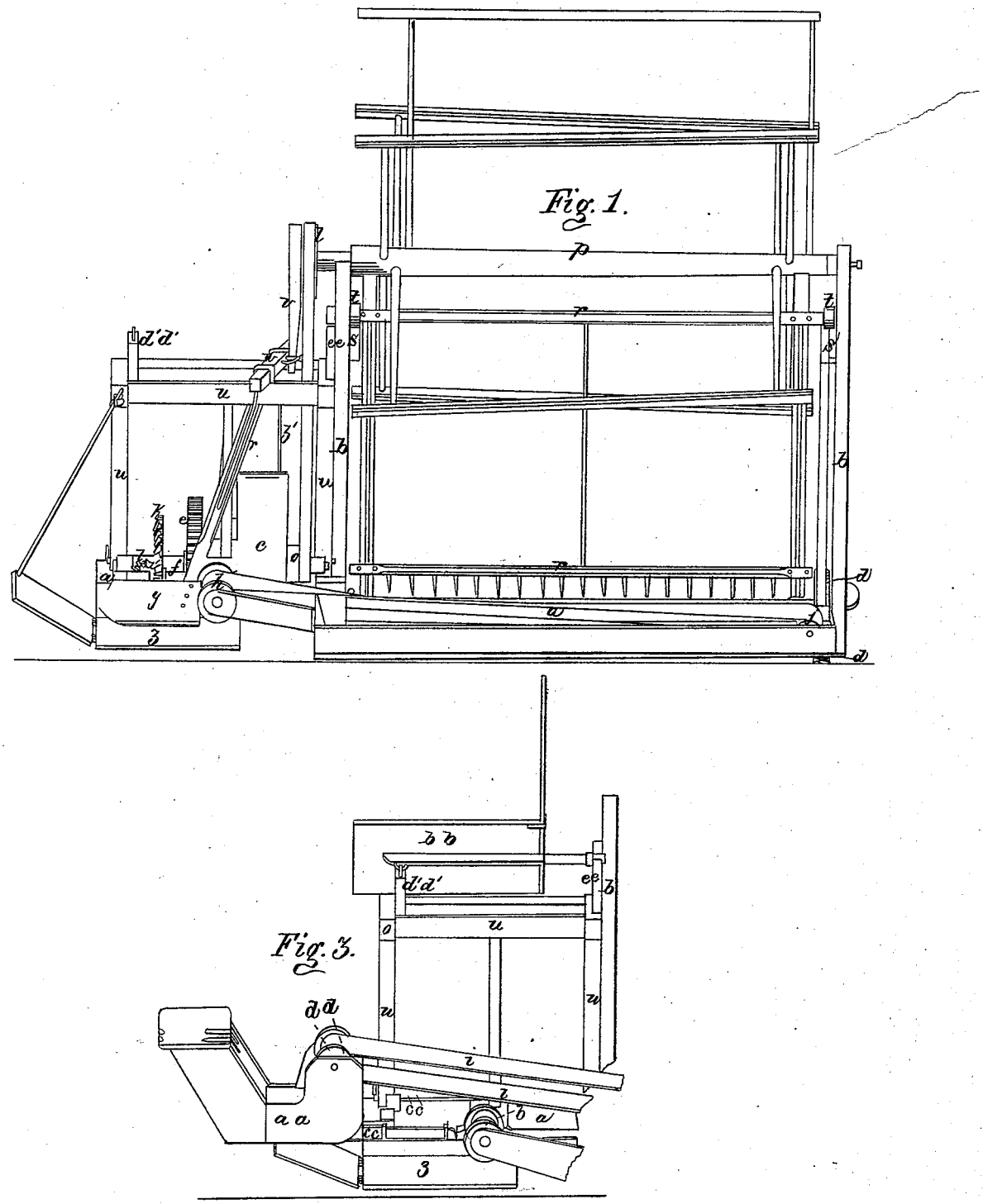
Figure 2:
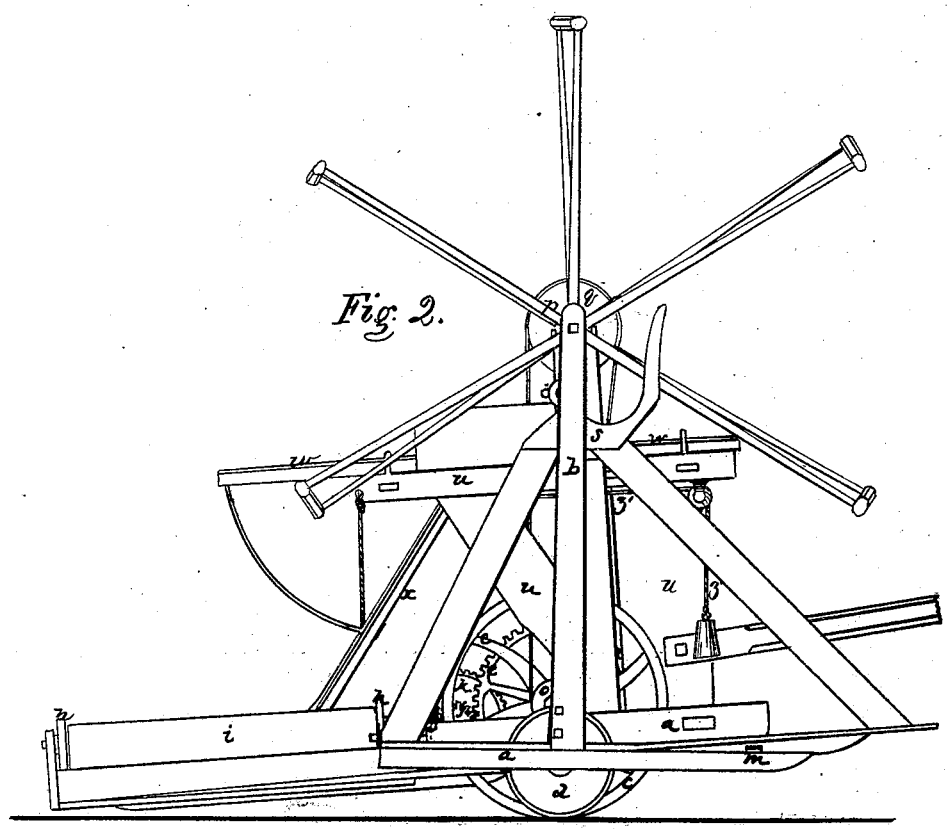
Figure 4:
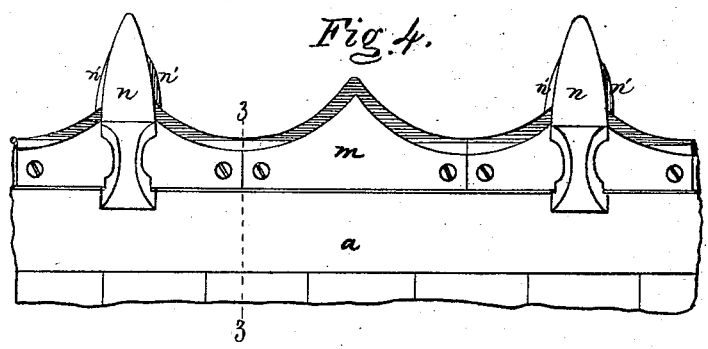
Figure 5:
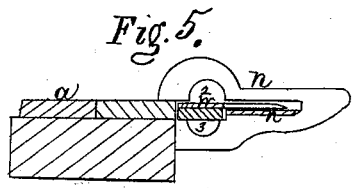

Figure 1 is an elevation of the rear of my machine; Fig. 2, an elevation of the side; Fig. 3, another view, taken in the rear of a part of the frame, (the gearing and other details fully shown in other figure dispensed with,) exhibiting the mode of attaching the binders' seat, &c.; Fig. 4, a plan of a portion of the platform, having the sickle arrangement attached; and Fig. 5, a section taken in the line $z\ z$ of Fig. 4.

Where the same letters occur like parts are thereby indicated.

In the construction of my machine I employ any suitable frame, $a$, with uprights or stanchions $b$ affixed. This frame is mounted upon wheels $c$ and $d$, the axle working in boxes, which may be depressed or raised by set-screws or any other mechanical means, so that the grain can be cut at any height from the ground. The wheel $c$ is made large and heavy, carrying on its axle a toothed wheel, $e$, working into a smaller one, $f$. This latter wheel is beveled on one side, so as to gear into another bevel-wheel, $g$, hung to the shaft of the roller $h$, upon which and the roller $j$ the endless apron or table $i$ revolves. On the shaft of the pinion $f$ a larger bevel-wheel, $k$, is keyed. This wheel causes a smaller one, $l$, to revolve, having on its shaft, at the front of the machine, a crank or bent arm. To this arm a pitman connects a bar carrying the sickle $m$, by which means the sickle has a lateral reciprocating motion through the guards $n$, (see Figs. 2, 4, and 5,) that of Fig. 2 showing the end of the bar and the opening in the frame. On the under side of the slot in the fingers through which the cutter $m$ works is welded or riveted a shear-blade, $n'$, against which said cutter works. This shear-blade $n'$ may, however, be above the slot, and the bevel-edge of the cutter be turned down, and still accomplish the same result. The openings 2 3 in the fingers above and below the cutter $m$ are for the purpose of preventing said cutter from clogging in the fingers by the grass, leaves, &c. The sickle-edge is made by forming the grooves or nicks in a line parallel to its motion, by which the edge is self-sharpening. Fig. 4, the points taking the grain, &c., in a direct line instead of oblique, across the points, as heretofore, which wears off the points or edge of the sickle.

Mounted upon the stanchions $b$, I cause the reel $p$ to revolve by means of the pulley $q$, belted to a drum, $o$, on the shaft of the tread and driving wheel $c$. This reel (see Figs. 1 and 2) carries on one of its arms a rake-frame, $r$, having friction-rollers $t$ on the extremities of its upper cross-tie. Securely fastened to the sides of the stanchions $b$ cam-pieces $s$ are placed. Thus by the friction-rollers $t$ passing over these pieces the movements of the rake, which has a sliding motion, are governed. Another important feature in the cams $s\ s$ is this: it enables me to place the reel over or nearly over the cutters, which puts it in such position as at all times to bring a regular quantity of grain to the cutters, not bringing too much when the grain leans one way and not enough when it leans the other way, perfectly controlling the operation of the rake, whether in straight or leaning grain, as it must follow the shape of the cam $s$ from point to heel. Above the gearing a strong frame, $u$, is made, to which the draft-bar is made fast, so as to balance or counteract the force brought against the machine in its operation. From the pulley $q$ of the reel an arm, $v$, projects downward and strikes at intervals, during the revolution of the reel, a bar, $w$, resting upon the top of the frame $u$. This bar has an arm, $x$, projecting diagonally toward the rear of the machine and directly in front of the apron $i$, at which point a suitable board or plate, $y$, is bolted to it. Beneath this a table, $z$, is placed, having a side board, hinged and held up by a cord made fast to the frame $u$. To the arm $x$, for the purpose of drawing it back, a weighted cord, $z'$, passes over a roller secured at the forward part of the machine, as seen fully in Fig. 2.

To complete my machine, so as to work pe fectly in every respect, I have a seat, $a\ a$, for binding purposes, and also a rack, $b\ b$, which may be placed, when necessary, to the reapers. This seat, (see Fig. 3,) when placed on the machine, extends from the front to the back, and is held to the frame $a\ a$ by two or more pieces, $c$ $c$, securely, by passing through straps in the frame. There is also attached a roller, $d$ $d$, to which the apron $i$, if lengthened, can be attached. The rack $b$ $b$ rests upon an arm, $d'$ $d'$, projecting above the frame $u$, and also upon a raised board, $e'$ $e'$. By this means, having its bearing at these points, it is capable, if slight pressure be applied at the back end of the rack, of lowering so as to discharge the sheaves of grain in order for shocking.

Having set forth fully the manner of constructing my machine, I shall now proceed to describe the operation of the same.

As the machine is drawn forward the wheel $e$ communicates to the various parts motion. The reel, in revolving, by its arrangement of arms, first inclines or lies downward preparatory to the cut of the sickle. The standing grain then follows the cut, the grain falling on the platform made for its reception immediately beneath the reel. From thence it is removed by the action of the rake $r$, which takes hold at a point just behind the sickle, and on the butt-ends of the fallen grain, at a suitable distance from the platform, which distance is retained by the movements of the friction-rollers on the cam-pieces $s$, is carried back and laid on the revolving apron $i$, by this conducted transversely of the machine to a certain point, where it is deposited on the table $z$, and thence removed or forced from the machine onto the stubble by the movement of the slide or bar $w$, with its attachments.

The foregoing-described arrangement will be understood as used when the grain is wet or green, or not suitable for binding at the time of cutting; but if, on the contrary, the grain is perfectly dry and ready to be bound, I employ the arrangement described and shown in Fig. 3, by which the reaping and binding is performed in one operation, and the grain left in sheaves, ready to form the shocks. The operation in this case will be in this manner: The apron or table $i$, that acts as a conductor for the cut grain, is extended out so as to pass round the rollers $d$ $d$, and here is seated the binders, so as the grain reaches the head of the apron, or at the turn of roller, the binders catch it, and, having bound it properly into the required-sized sheaves, pass it upon the tilt-rack $b$ $b$, and from thence by the pressure of hand is thrown on the ground in sufficient numbers to form a shock. Thus it will be seen at each revolution of the reel a sufficient amount of grain is passed from the machine to the ground, ready for forming the sheaves when properly dry, and if all ready and suitable for binding is adapted so as to bind and discharge the grain in suitable quantities to form the shocks. The other advantages are in the sickle and guards, which by their peculiar construction and formation can work with all ease and certainty with a sure cut, and without the least danger of clogging, and also the grain can be cut at any required distance from the ground without any inconvenience.

Having thus fully described the construction and operation of my improved reaper, what I claim therein as new, and desire to secure by Letters Patent, is—

The device for forcing the unbound grain from the table $z$, in combination with the arm $v$ at the end of the reel, and the apron $i$, by means whereof the grain is carried from the platform to the receiving table, and thence deposited upon the stubble in convenient quantities for binding.

A. I. COOK.

Witnesses:
 EDWIN BARTON,
 JOHN E. BEAM.